M. R. WOODWARD & E. G. DEAN.
BOX.
APPLICATION FILED MAY 26, 1908.
1,055,116.
Patented Mar. 4, 1913.
2 SHEETS—SHEET 2.
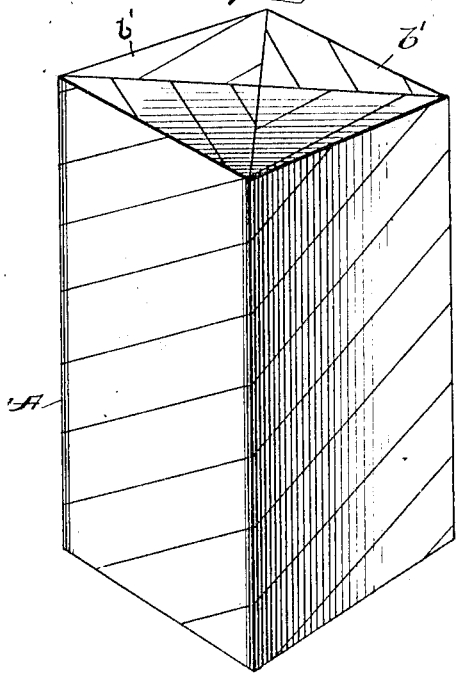
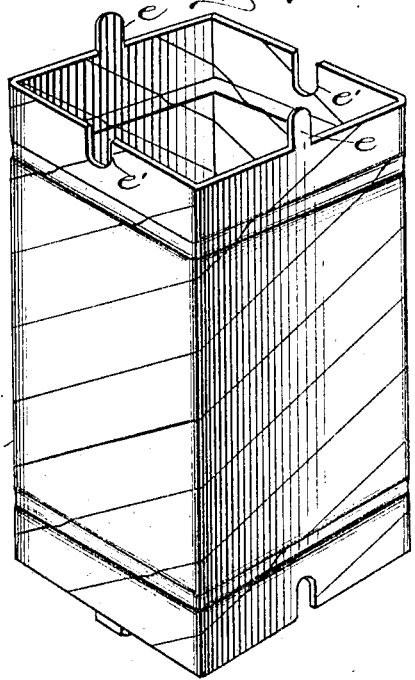
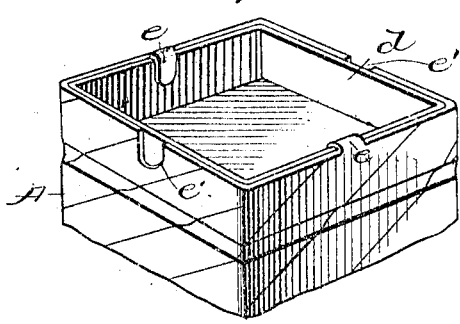
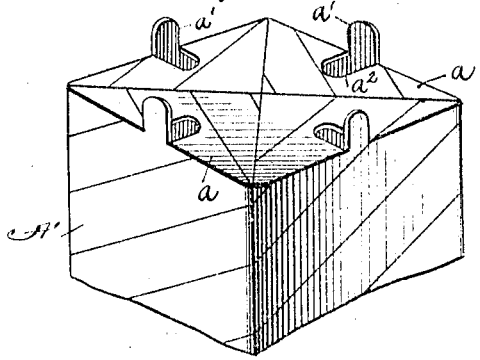
Witnesses
J. M. Fowler Jr.
H. Strauss.
Inventors
Mark R. Woodward and
Elmer G. Dean
Geo. B. Pitts
Attorney

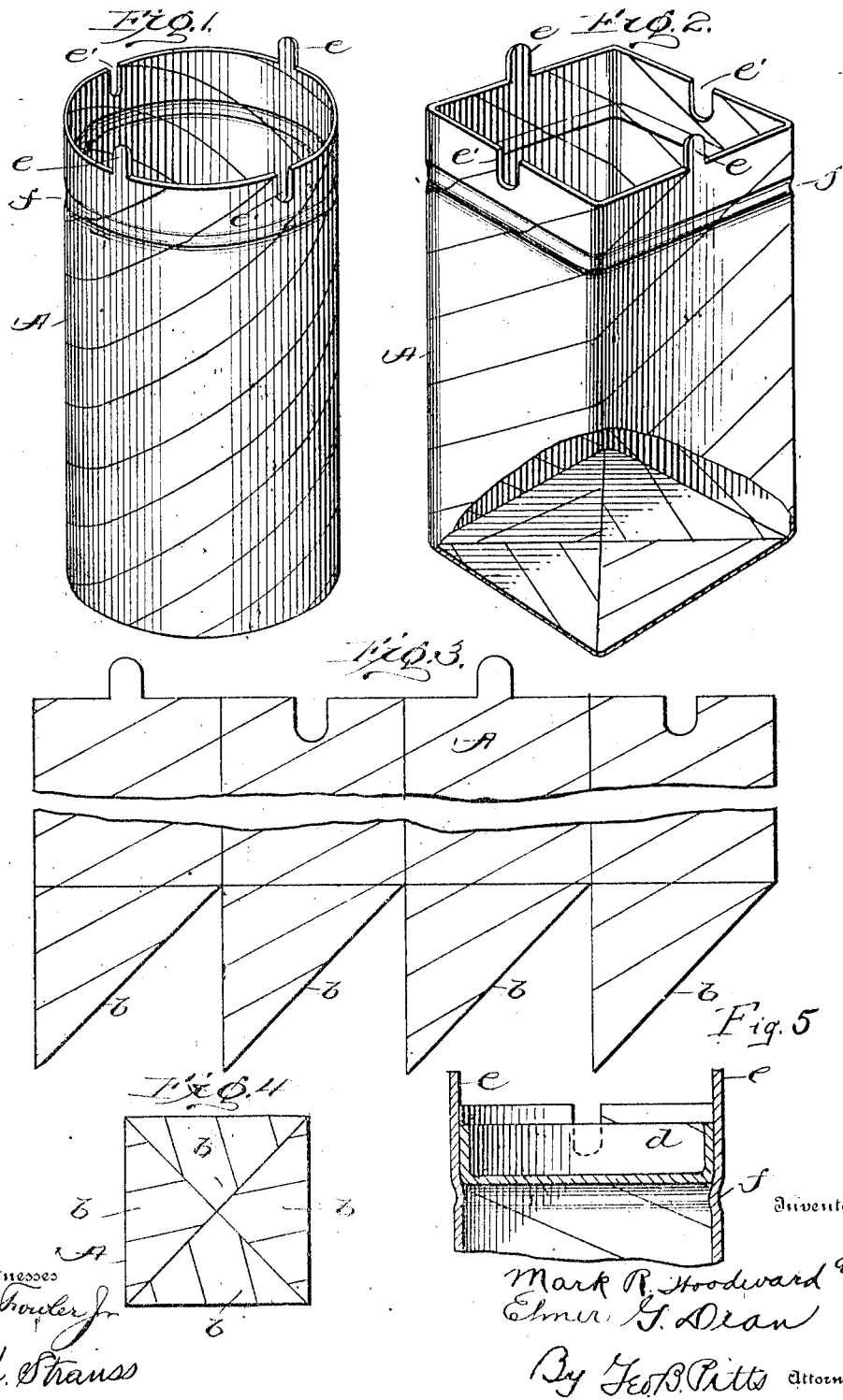

UNITED STATES PATENT OFFICE.

MARK R. WOODWARD, OF WASHINGTON, DISTRICT OF COLUMBIA, AND ELMER G. DEAN, OF NIAGARA FALLS, NEW YORK, ASSIGNORS TO AUTOMATIC LIQUID BOX COMPANY, OF NIAGARA FALLS, NEW YORK, A CORPORATION OF NEW YORK.

BOX.

1,055,116.  Specification of Letters Patent.  Patented Mar. 4, 1913.

Application filed May 26, 1908. Serial No. 435,029.

*To all whom it may concern:*

Be it known that we, MARK R. WOODWARD and ELMER G. DEAN, citizens of the United States, and residing at Washington, District of Columbia, and Niagara Falls, county of Niagara, State of New York, respectively, have invented new and useful Improvements Relating to Boxes, of which the following is a specification.

Our invention relates to boxes or receptacles, and particularly boxes cut from a section of spirally wound tubing of any shape in cross section.

One object of the invention is to produce a box which is formed from a spirally wound strip or strips, and provided at one or both ends with integral flaps.

Another object of the invention is to produce a spirally wound box provided with integral closing flaps at one or both ends and also provided with integral ears or tabs.

A further object of the invention is to produce a spirally wound, polygonally shaped box provided with closing means at one or both ends thereof.

We have shown in the drawings accompanying this application, boxes of cylindrical and square shape in cross section, but it will be understood that the box may be of any shape desired, without departing from the spirit of our invention.

Referring to such drawings: Figure 1 is a perspective view of a spirally wound, cylindrical shaped box embodying our invention. Fig. 2 is a perspective view of a spirally wound, polygonally shaped box. Fig. 3 is a view of a developed box of polygonal shape. Fig. 4 is a bottom plan view of the box shown in Fig. 2. Fig. 5 is a cross section of the upper portion of the box shown in Fig. 2 showing an independent closing cap in position. Fig. 6 is a perspective view of a box having integral closures at both ends. Fig. 7 is a perspective view of a box in which integral tabs are provided at both ends thereof. Fig. 8 is a bottom view of Fig. 7. Fig. 9 is a view of another form of the invention.

In the drawings, A indicates a spirally wound box cut from a tube that is formed from one or more strips of flexible material.

In carrying out our invention, we provide the box with flaps formed integral with the sides thereof and adapted to form a closure for one or both ends of the box, or to coöperate with a cap for closing the box, as may be desirable. When desired the flaps at that end of the box which is to be used as the top, may be left projecting and operate as pulling tabs or ears.

Referring particularly to Fig. 3, $b$, $b$, indicate one form of flaps, integral with the sides of the box, arranged to be collapsed or folded with respect to the sides of the box A to form a bottom closure therefor. These flaps $b$ are of suitable shape and size in order that they may coöperate with each other, when folded down or substantially at right angles to the sides of the box, to form a closure, such as illustrated in Figs. 2 and 4. In this form of the invention, the coöperating flaps should be of a size to cover that portion of the end of the box included in lines drawn from the opposite corners of that side from which each flap extends to the center or longitudinal axis of the box. But in the preferred form of the invention, each flap is of a length equal to the width of the side of the box adjoining that from which it extends. This form of construction permits the free ends of the flaps, when the latter are folded or collapsed, to be interlocked one with another, whereby the end of the box may be securely closed.

When desired both ends of the box may be provided with integral coöperating closing flaps. This form of construction is shown in Fig. 6, wherein $b'$, $b'$, indicate the closing flaps at the top of the box, the bottom of the box being closed by flaps $b$. The flaps $b'$ for the top of the box are preferably similar in shape to the flaps $b$ and arranged to interlock one with another to provide a suitable top end wall or closure.

Referring to Figs. 1, 2, 3, 5, 7 and 8, we illustrate another form of flap $c$, $c$, integrally united with the sides of the box and adapted to coöperate with a closing cap $d$. In this form of the invention the flaps $c$, $c$, on the bottom of the box are bent over to engage with and hold in place the cap $d$, which is preferably cup-shaped; while those at the opposite end may be left projecting upward and operate as gripping or pulling tabs, so that the box may be readily raised out of a crate.

$e'$, $e'$, indicate slots or cut away portions extending inward from the end or ends of the box that are to be closed by a cap. These slots $e'$ permit the operative to easily grip the cap between his fingers and to remove the cap in a simple manner.

When one or both ends of the box are closed by a cap, we prefer to constrict or slightly reduce that end which is to be thus closed, as is indicated at $f$. This constriction operates as a seat for the cap.

In the preferred form of the invention, shown in Figs. 1 and 2, we provide the box at its bottom with coöperating flaps $b$, and at its top with tabs $e$. These tabs may be arranged at any point or points around the end of the box. When desired a cap may be inserted in the top, and sealed in any suitable manner if found necessary.

In Fig. 9 we have shown a different form of the invention. $A'$ indicates a box having flaps $a$ adapted to form a closure for its opposite ends. $a'$ indicates a tab formed on each of the flaps $a$. These tabs are formed by cutting the flaps on the line $a^2$ and are preferably united at their bases along the top edge of the box. It will be understood that these tabs may be formed in the flaps at either or both ends of the box as may be desirable.

It will thus be seen that we have produced a spirally wound box having formed integral with its sides devices for closing its ends. It is particularly adapted for holding articles that are to be shipped in crates, as the devices for closing the ends of the box and for raising it out of the crate are all formed integral with its sides and do not project laterally therefrom. By this construction the boxes may be packed closely together.

The box may be coated on one or both surfaces with a waterproofing or other material. When coated with a waterproofing material, the bottom is sealed tightly and the box may then be used for holding and conveying liquids and similar substances.

As will be clearly understood from the drawings and the foregoing description, the lines of fold extending longitudinally of the box permit it to be collapsed when desired in order that the box will occupy minimum space.

What we claim is:

1. A collapsible bag, provided with a mouth adapted to be closed by folding, and having its walls composed of spirally wound material, substantially as described.

2. A seamless, spirally wound, collapsible bag, provided with collapsible closures at each end; substantially as described.

3. A spirally wound bag having collapsible top and bottom closures integral with its body portion; substantially as described.

4. A spirally wound bag having its body portion provided with longitudinal weakened folding lines; and its bottom closure integral with said body portion; substantially as described.

5. A collapsible bag having a collapsible end closure; and walls each composed of a plurality of spirally wound strips; substantially as described.

MARK R. WOODWARD.
ELMER G. DEAN.

Witnesses to the signature of Mark R. Woodward:
  WM. L. VETTER,
  C. A. DENMAN.

Witnesses to the signature of Elmer G. Dean:
  FRED LASHWAY,
  JOSEPH HENRY.